United States Patent Office 3,736,230
Patented May 29, 1973

3,736,230
PROCESS FOR PRODUCING 6-AMINO-PENICILLANIC ACID
Per Staffan Delin, Villagaten 24; Bertil Ake Ekstrom, Kummelvagen 26; Lars Solve Nathorst-Westfeld, Kummelvagen 32; Berndt Olof Harald Sjoberg, Kummelvagen 24; and Karl Hugo Thelin, Fornminnesvagen 9, all of Sodertalje, Sweden
No Drawing. Continuation-in-part of application Ser. No. 799,983, Feb. 17, 1969, now Patent No. 3,622,462. This application Nov. 22, 1971, Ser. No. 200,826
Int. Cl. C12d 1/02
U.S. Cl. 195—36 P                15 Claims

ABSTRACT OF THE DISCLOSURE

A process for the production of hypoallergenic 6-aminopenicillanic acid by enzymatic degradation of a natural penicillin with an *Escherichia coli* penicillin acylase chemically fixed to a polymeric support.

---

This application is a divisional and continuation-in-part application of our application Ser. No. 799,983, filed Feb. 17, 1969, now U.S. Pat. No. 3,622,462.

This invention relates to an improved method for the production of 6-aminopenicillanic acid (6-APA) by enzymatic degradation of a penicillin and to improved method for the production of penicillins especially for that of hypoallergenic penicillins. It further relates to an improved method for the production, purification and isolation of an enzyme preparation capable of removing the side chains of certain penicillins under formation of 6-APA. In particular it refers to the production of an enzyme preparation from *Escherichia coli* and its use for the production of 6-APA from benzylpenicillin.

It is known that many microorganisms, both bacteria and fungi, produce enzymes, which can hydrolyse the amide bond in the 6-position of penicillins and which are generally termed penicillin acylases or amidases (for a review, see J. M. T. Hamilton-Miller Bacteriological Reviews 30 (1966) 761). In the present industrial production of 6-APA, suspensions of *E. coli* cells containing an acylase or amidase are preferably used. These processes, however, have several drawbacks. Since the enzyme is largely intracellular, the penicillin must first, of necessity, penetrate the cell bodies in order to react with the enzyme which results in a slower reaction. The strain used may also contain other enzymes which inactivate the penicillin, or the 6–APA formed, by splitting the β-lactam bond or which may contaminate the cell culture with the organisms that produce such enzymes. As the acylase constitutes only a very small portion of the cell content a process using whole organisms also has a practical disadvantage in that it involves large amounts of material that are inactive in the process.

A further disadvantage experienced by the use of whole organisms is that an extra step must be added to the series of processes leading to the production of semisynthetic penicillins, namely, the separation (e.g., by filtration) of the organisms from the reaction fluid in which the original side chain has been split off from biosynthetic penicillins. A further disadvantage is the loss of penicillanic acid caused partly by adsorption to the cells, and partly by degradations induced by materials produced during the cell metabolism. Still another factor tending to give rise to problems associated with the use of whole cells for the preparation of 6-aminopenicillanic acid from biosynthetic penicillins is that separation of the acid from other products of the split off reaction is made quite difficult. Thus Batchelor et al. (Lancet I (1968) 1175) have reported that 6-APA obtained by the use of whole cells may contain proteinaceous impurities capable of eliciting dangerous allergenic reactions in man and animal. When penicillins are made from such contaminated 6-APA the impurities may be retained in the products and be responsible for many of the allergic reactions observed with these penicillins (G. T. Stewart, Amer. Heart. J. (1968) 429). In order to remove these impurities, the 6-aminopenicillanic acid or the penicillins prepared therefrom must be subjected to additional separation processes including, e.g., dialysis or gel filtration (Canadian Pat. No. 771,-662). Hereby large proportions of the 6–APA or of the penicillin are lost as demonstrated by a recovery of only 12% of benzylpenicillin (British Pat. 1,078,847) and of 56% of phenoxymethylpenicillin (British Pat. 1,114,311).

All these obstacles can be avoided when a cell free or purified enzyme preparation according to the present invention is used. Thus the 6–APA formed by using a cell free or purified enzyme preparation according to the present invention for the splitting of the amide bond in the 6-position of an enzymically deacylable natural or biosynthetic penicillins are obtained in good yields and are essentially free from proteinaceous impurities. The term "natural or biosynthetic penicillins" as used in this specification refers to such penicillins where the side chain is derived from a monosubstituted acetic acid. Such penicillins may be obtained by fermentation in substrates containing the appropriate acetic acid or a suitable derivative thereof. When the 6–APA prepared in this way is acylated hypo-allergenic penicillins are obtained in good yields without any additional purification. In the literature several attempts to prepare purified enzyme preparations from *E. coli* strains have been recorded. Borkar et al. (Hindustan Antibiotics Bull. 4 (1961) 48, 152) treated cells suspended in a phosphate buffer with ultarsonic waves and achieved a twenty-five fold purification by fractionated precipitation and column chromatography. Holt and Stewart (Nature 201 (1964) 824) obtained an enzyme preparation of low purity by freeze-drying and dialyzing filtered culture broth. Szentirmai (Acta Microb. Acad. Scient. Hung. 12 (1966) 395) obtained a fortyfold purification of an *E. coli* enzyme by ammonium sulphate precipitation, followed by calcium phosphate gel adsorption and DEAE cellulose chromatography of a phosphate buffer extract of *E. coli* cells treated with ultrasonic waves.

Sakaguchi and Murao (Japanese Pat. 26,050/64) obtained a moderate yield of a purified enzyme preparation from *E. coli* by extracting the cells with borate buffer for an extended period of time or for a shorter time in combination with ultrasonic waves treatment. From the extract the enzyme could be obtained in solid form after precipitation with ammonium sulphate, dialysis and freezed-drying. Johnson and Hardcastle (U.S. Pat. 3,297,-546) obtained a solution of an enzyme from *E. coli* by treating the cell culture with a compound $MX_2$, usually $Ca(NO_3)_2$ and a quaternary ammonium compound, filtering off the cells and suspending them in water for some hours, and then removing the cells by filtration with subsequent treatment of the filtrate with activated carbon.

It is further known that enzymes contained in bacterial cells can be released on high pressure extrusion of cell suspensions through a small orifice. Duerre and Ribi (Appl. Microbiol. 11 (1964) 467) studying other types of enzymes than penicillin amidases found in *E. coli* observed that high pressure, in excess of 15,000 p.s.i. had to be used to obtain maximal release of the enzymes. At such pressures, however, the cell walls were also fragmented and large portions of the cell material was solubilized. Frazer (Nature 167 (1951) 33) found that *E. coli* cells could be ruptured on a small scale when they were expelled from a bomb by a gas pressure of 500–900 p.s.i.

We have now found that the intracellular penicillin acylase in *E. coli* can be extracted from the organism into water in large production scale after the cells, or suspensions of them in water or a mixture of water and organic solvents, have been rapidly released from an applied pressure of at least 500 p.s.i. but not exceeding the pressure where excessive disruption of the cell occurs.

Thus, the present invention in one aspect provides a process for production of penicillin acylase preparation from *E. coli* comprising fermentation in a known way of an *E. coli* strain producing such an enzyme, removing the culture fluid and rapidly expelling the cell material through a narrow orifice or slit by application of pressure of at least 500 p.s.i. but not exceeding the pressure where excessive disruption of the cell occurs. Still at 3,000 p.s.i. the cells are not excessively disrupted. The expelled material is then stirred with water eventually with addition of an organic solvent and/or a base, like sodium hydroxide or triethylamine, to dissolve the enzyme.

In one embodiment of the present invention the removal of the culture fluid and the expulsion of the cell material are effected simultaneously in a self-cleaning centrifugal separator, operated at a temperature between 0–50° C., preferably at 15–40° C. where the separated cell material is expelled intermittently within 0.05–1.0 sec., preferably within 0.1–0.5 sec., through a periferal slit with a width of 0.1–1.5 mm., preferably 0.3–0.7 mm. by application of pressure of 500–2,000 p.s.i., preferably 900–1,100 p.s.i. If desirable, the broth is saturated with an organic solvent having low solubility in water such as butylacetate, isobutylacetate or amyl acetate in order to kill the organism, and to aid the process in the separator. Likewise it is possible, if desirable, to wash the cell material with water in the separator. The expelled cell material is stirred at 10–50° C., preferably at 20–40° C., for 0.10–5.0 hrs., suitably 0.25–3.0 hrs. and preferably 0.25–1.0 hr. with an efficient stirrer to dissolve the enzyme, and possibly with addition in a concentration of 1.0–5.0% of a water immiscible organic solvent such as methylisobutyl ketone, butylacetate, isobutylacetate, amyl acetate, benzene, toluene or chloroform. In order to facilitate the extraction of the enzyme from the expelled cell material an inorganic base, such as sodium hydroxide, potassium hydroxide or ammonia or a tertiary organic base such as triethylamine or N-ethylpiperidine, may be added to the mixture to adjust and sustain the pH at a value between 6.5 and 9.0, preferably between 7.0 and 8.5.

The enzyme solution thus obtained can, possibly after dilution with water, be freed from any remaining cell material and other solid impurities by common processes such as filtration or centrifugation, and eventually by a combination of both processes and possibly with the addition of decolorizing, clarifying and filtering aid agents such as activated carbon, aluminia, cellulose powder, diatomaceous earth or other solid, weak adsorbing agents. One preferred method is to remove most of the cell material by centrifugation and to filter the supernatant.

Additional purification of the enzyme can be obtained by acidification of the aqueous solution to pH 3.0–6.0, preferably to 4.0–5.0, and then adjusting the solution to pH 7.0–8.5 with removal of the precipitated inactive material by filtration after each adjustment of pH and finally readjusting the pH to its original value.

The penicillin acylase contained in the cell free, and if desired, partly purified aqueous solutions referred to above can be precipitated by treatment of the solutions with agents, like tannins, which form sparingly soluble complexes with proteins. In one preferred form of this process the enzyme solution is treated at pH 4–6, suitably at pH 4.5–5.5 with tannin to a final concentration of 300–900 p.p.m. in presence of chelating agents, like ethylenediamine tetraacetic acid, forming complexes with iron ions. The enzyme-tannin complex formed my be isolated in a common way, e.g. by filtration or centrifugation. It may be washed and dried and freed of water, e.g. by drying, especially by freeze-drying, or by treatment with water miscible organic solvents like acetone. The tannin complex is a suitable form for storage and transport of the enzyme. It can also be used directly for the removal of the side chain of penicillins like benzylpenicillin.

The penicillin acylase contained in the tannin precipitate may be released into aqueous solution by dissolution of the complex in water at pH 7–9, preferably 7.5–8.5. Alternatively the complex may be treated with a mixture of water and a water immiscible solvent like n-butanol at pH 4–7, preferably 4.5–5.5. A third method of removing the tannin consists in treating the enzyme-tannin complex, suspended in water with an anionic ion exchanger, like DEAE-cellulose, which binds the tannin and releases the enzyme into water. The amounts of water necessary for these operations are far less than those present in the original enzyme solutions and in this way a considerable concentration of the enzymatic activity is achieved.

In a further aspect of the invention the penicillin acylase contained in any solution referred to above may be concentrated and purified with the aid of an ion-exchanger. In a preferred form the enzyme is adsorbed on a cationic ion-exchanger with an open structure such as SE-Sephadex®, CM-cellulose or CM-Sephadex® by passing the solution of the enzyme adjusted to pH 3.5–6, preferably 4.0–5.0 through a column of the exchanger. Alternatively the exchanger may be added to the stirred enzyme solution. The acylase can be released from the ion-exchanger by elution at pH 6.0–8.0 with weak buffer solutions such as 0.2 M ammonium acetate or trishydroxymethylammonium acetate.

In order to get purer prepartions of the enzyme, inorganic ions and low molecular weight impurities can be removed from the enzyme solutions by dialyzation against water. Alternatively the solutions if necessary after concentration by evaporation at a temperature below 50° C. to a suitable concentration of 25–100 mg. dry weight per ml., are submitted to gel filtration.

The aqueous enzyme solutions thus obtained at any of the previous stages are highly suitable to be used directly for the removal of the side chains of natural penicillins, especially for removal of the side chain of benzylpenicillin.

In a further aspect of the present invention the enzyme as heretofore prepared is isolated from aqueous solution in the solid state by freeze-drying, float-drying, spray-drying or concentration in vacuo or by precipitation according to known procedures. The isolation process results in a solid enzyme possessing a high specific activity and which is a very suitable form for storage or transport. The use of such solid, water soluble enzyme preparations also has several technical advantages as it makes possible work with more concentrated solutions than those utilized by the known processes which employ cell suspensions.

The preferred method for isolating the enzyme consists in either freeze-drying an enzyme solution at a temperature between −10 and +50° C., preferably between 0 and 30° C., or by float-drying it in an air stream at 10 to 55° C., preferably 35 to 45° C.

The purified enzymes and enzyme solutions obtained according to this invention are very suitable and advantageous for the production of 6-aminopenicillanic acid by removing the side chain of penicillins, especially that of benzylpenicillin. The yields and purities of the products are considerably better than those obtained with known processes, using suspensions of *E. coli* cells.

We have also found that the 6-aminopenicillanic acid prepared according to this invention contains very little if any of the proteinaceous impurities with allergenic properties obtained when suspensions of *E. coli* cells are used for its production. This is of great technical importance as it is thus possible to prepare penicillins with hypoallergenic properties directly from the 6-APA prepared according to this invention without any additional purification processes. Examples of penicillins with hypo-allergenic properties which may be prepared in this way are: α-phenoxyethylpenicillin, α-phenoxypropylpenicillin, 2,6-dimethoxyphenylpenicillin, 3 - (o - chlorophenyl)-5-methyl-4-isoxazolylpenicillin, α-carboxy-benzylpenicillin, α-azidobenzylpenicillin and α-aminobenzylpenicillin.

The penicillin acylase of *E. coli* can also be used for removing the side chain of penicillin esters especially of esters of benzylpenicillin as described in British patent application No. 33,734/67. We have now found that the enzyme preparations obtained according to this invention are very suitable for this process and are more efficient than suspensions of *E. coli* cells previously used. Furthermore we have also found that the enzyme preparations according to this invention are superior to the previously used cell suspensions in the enzymatic synthesis of penicillins from 6-aminopenicillanic acid and side chain precursor (W. K. Kaufmann et al., Antimicrobial Agents, Ann. 1960, 1).

The purified enzyme preparations obtained according to this invention are suitable starting materials for chemical modification of the enzyme resulting in products with better properties with respect to activity and/or technical performance. Thus the enzyme can react with activated polymeric materials, such as, e.g. polysacharides treated with cyanogen bromide, to give products where the enzyme is fixed to a polymeric support. The enzymatic activity is retained in such products which are of advantage to use for the splitting of penicillins as they can be recovered from the reaction solution by simple means, e.g. by filtration. The polymeric enzyme-preparation can also be used in columns for continuous production of 6–APA by passing solution of penicillins through the column.

A preferred method for chemical modification of the acylase is by covalent coupling to insoluble activated polysaccharides, for instance, dextrane, Sephadex®, α-glucan or Sepharose®. The method comprises equilibrating the polysaccharide with water at room temperature, cooling of the mixture and, thereafter, adding of sodium hydroxide followed by a cyanogen halide, for instance cyanogen chloride or cyanogen bromide. The cyanogen halide is added, with stirring, suitably at a temperature of from 0° C. to about 25° C., preferably at a temperature of from 0° C. to about 10° C., whereupon the activated polymer is separated and washed with water. Coupling of penicillin acylase to the active wet polymer can be effected by reacting the components in a water suspension, suitably at a temperature of from about 2° C. to about 10° C., preferably at a temperature of from about 3° C. to about 5° C., suitably during a time period from about 2 to about 30 hours, preferably during from about 10 to about 26 hours, at pH 7–9.5, preferably at pH 8.8–9.0. This pH-value can be effected by adding a suitable base e.g. sodium hydroxide or a buffering substance, for instance borax. Thereafter the polymer-acylase is separated.

A preferred method for production of 6-aminopenicillanic acid by use of acylase covalently coupled to a polymer, for instance a polysaccharide, comprises adding to a suspension of the acylase-polymer in water, containing a suitable buffering substance, a biosynthetic penicillin, preferably benzylpenicillin, in a concentration of from about 1 to about 10%, preferably from about 2 to about 5%, and subsequently incubating the mixture, with stirring, at a temperature of from about 30° C. to about 45° C., preferably at a temperature from about 35° C. to about 40° C. until the enzymatic reaction has ceased. During the reaction the pH is to be kept at 6.5–8.2, preferably at 7.3–7.8, by continuous addition of a solution of an alkaline compound, for instance sodium hydroxide or potassium hydroxide. The acylase-polymer is separated by filtration or centrifugation, washed with water and, thereafter, without demonstrable loss in enzymatic activity, ready for use in another splitting reaction. From the water solution obtained the acid which is split off in the enzymatic reaction, for instance phenylacetic acid from benzyl-penicillin, can be extracted by means of a suitable water-immiscible organic solvent for instance methylisobutyl ketone, ethyl ether, butyl acetate or iso-amylacetate at pH 1.5–4, preferably 2–3. The organic layer is separated and the water phase neutralized to pH 7–8, preferably 7.4–7.7, by means of alkali, for instance sodium hydroxide or potassium hydroxide, whereupon the solution is concentrated in vacuo, preferably to a concentration of at least 10% of 6-aminopenicillanic acid. The concentrated solution is acidified to pH 4–4.6, preferably to 4.3–4.4, by means of a mineralic acid, for instance sulphuric acid, hydrochloric acid or nitric acid. The precipitated crystalline 6-aminopenicillanic acid is isolated and dried for subsequent use as a starting material in production of semisynthetic penicillins according to known methods.

It is also possible to make semisynthetic penicillins directly from the original solution obtained in the enzymatic splitting of penicillin without previously extracting the acid originating from the side chain and isolating of the 6-aminopenicillanic acid. The 6-aminopenicillanic acid and/or the semisynthetic penicillin compounds isolated following enzymatic splitting of penicillin by use of polymer-bound acylase show very low contents of proteinaceous and other high molecular impurities with allergic properties compared to the compounds obtained by means of suspensions of acylase-producing *E. coli* cells.

The preparation and purification of a cell free enzyme product, the preparation of 6-aminopenicillanic acid from natural penicillins (e.g. benzyl penicillin) and the preparation of synthetic penicillins from 6-aminopenicillanic acid is illustrated in the following examples.

EXAMPLE 1—PRODUCTION OF *E. COLI* BACTERIAL CELLLS

Corn steep liquor (3 kg.), soybean oil (135 ml.), paraffin (12 ml.) and cetanol (3 ml.) in water (150 l.) was adjusted to pH 6.0 with 45% sodium hydroxide (165 ml.) and then sterilized at 124° C. for 30 minutes in a fermentation seed tank. The solution was inoculated with 100 ml. of a 20–24 hr. culture of *E. coli* (Astra 1339) and incubated at 25° C. with aeration and agitation for 18 hrs.

Corn steep liquor (300 kg.), soybean oil (13.8 kg.), paraffin (1.22 kg.), cetanol (0.3 kg.), phenylacetic acid (21 kg.) and sodium chloride (112 kg.) in water (14,000 l.) was adjusted to pH 6.6 with 45% sodium hydroxide (40 kg.) and the solution sterilized in a fermentation tank at 124° C. for 30 minutes. The solution was cooled and inoculated with the above mentioned seed culture and subsequently incubated at 25° C. with agitation and aeration. Twenty-four hours after the inoculation and when the pH had risen to 8.2, the bacterial cells were killed by the addition of butyl acetate (180 l.) and the mixture was subsequently cooled.

EXAMPLE 2—ISOLATION AND PURIFICATION OF ACYLASE (a) For isolation of the bacterial mass the mixture was separated in a self-cleaning centrifugal separator (De Laval, type BRPX 213–35S). The bacterial cell paste was collected in 100–120 kg. portions. To each portion was added 3.0% of methylisobutyl ketone and the mixture was then homogenized by means of an Ultra Turrax stirrer (type T 110/2 M) for 25 minutes. The total yield of bacterial mass was 325 kg.

Analysis of the enzyme in the different production steps gave the following figures in acylase units determinative of the amount of enzyme remaining during the particular step (one acylase unit corresponds to the amount of enzyme capable of splitting in 1.5 hours at pH 8.5 and 37°

C. an amount of benzylpenicillin equivalent to 1 mg. of 6-aminopenicillanic acid):

| | |
|---|---|
| Production fermentation culture u./ml | 5 |
| Supernatent liquid u./ml | 0.33 |
| Centrifugal separator liquid effluent u./ml | 0.28 |
| Bacterial cell paste u./g | 212 |
| Supernatent liquid in paste, before homogenization u./g | 75 |
| Supernatent liquid in paste, after homogenization u./g | 123 |

(b) Bacterial cell paste obtained as in Example 2a was used in experiments on enzyme solubilization. To 100 g. of cell paste 100 ml. of deionized water was added.

The suspension obtained had a pH of 5.9 and was submitted to a series of treatments as follows:

(I) The suspension was centrifuged at 5,000 G (centifugal force measured in multiples of gravity) for 20 min. and the enzyme activity in the supernatent fluid was determined.

(II) The suspension was submitted to homogenization by means of an Ultra Turrax stirrer for 5 min. During this treatment the sample was cooled in an ice bath in order to avoid temperatures higher than 35° C. in the sample. The sample was then centrifuged as in I and the activity in the supernatent was determined.

(III) The pH of the suspension was adjusted to 8.5 with NaOH with stirring whereafter the sample was homogenized and centrifuged as above and the activity determined in the supernatent phase.

(IV) 3% methylisobutyl ketone was added to the suspension, the pH of which was adjusted as in experiment III. This sample was then submitted to homogenization and centrifugation as above and the enzyme activity determined in the supernatent phase.

The solubilization process may be demonstrated by the following table.

ENZYME SOLUBILIZATION

| | u./g. | Percent of total |
|---|---|---|
| Bacterial suspension | 106 | 100 |
| Supernatant obtained from— | | |
| I | 29 | 38 |
| II | 62 | 59 |
| III | 73 | 69 |
| IV | 83 | 78 |

(c) Homogenized bacterial paste (175 kg., activity 190 u./g.) was diluted with water (175 kg.) and Hyflo (22.7 kg.), Celite 505 (22.7 kg.), Fibraflo (10.2 kg.) added with agitation of the mixture. The water phase was separated by filtering on a Funda® filter and the filter cake washed with water (50 l.). The combined solutions (290 kg.) had an activity of 48 u./g.

(d) Homogenized bacterial paste (1 kg., activity 212 u./g.) was diluted with water (2.0 l.) adjusted to pH 8.5 by means of 0.5 N sodium hydroxide (220 ml.) and then stirerd at 20° C. for 30 minutes. The mixture was centrifuged at 13,200 G (Serwall, Type RC–2, Automatic Superspeed Refrigerated Centrifuge) for 30 minutes at 0° C. The supernatant liquid was decanted, clarified by filtration giving 2.7 kg. solution with an activity of 50 u./g. Resuspension of the sediment in water (1 l.) twice for 5 minutes at pH 8.5 followed by centrifugation gave an additional enzyme solution (2 kg., activity 11 u./g.). This corresponds to a total yield of activity of 74% of water soluble acylase.

(e) Clear acylase solution (2 kg., activity 50 u./g.) obtained as in Example 2d was lyophilized yielding 98.5 g. of solid acylase with an activity of 950 u./g.

(f) Clear acylase solution (2 kg., activity 50 u./ml.) obtained as in Example 2d was spray-dried yielding 92 g. of solid acylase, activity 920 u./g.

(g) Clear acylase solution (1 kg., activity 52 u./ml.) according to Example 2d was dialyzed for 8 hrs. against running tap water. The dialyzed solution was lyophilized yielding 20.5 g. of solid acylase, activity 2,400 u./g.

(h) Clear acylase solution (245 kg., activity 48 u/g.) obtained according to Example 2c was stirred and adjusted to pH 4.5 by means of 9–M acetic acid (2.2 kg.). The agitation was continued for 1 hr. and thereafter the mixture was filtered and the clear solution adjusted to pH 8.0 with 7–M ammonia (4.5 kg.) during agitation. After 1 hr. the mixture was filtered and the solution adjusted to pH 5 by means of 9–M acetic acid (2.0 kg.). The activity of the solution (220 kg.) was 47.5 u./g.

(i) Supernatent liquid (500 g., activity 52 u./g.) obtained as in Example 2d was adjusted to pH 4 and stirred for 15 minutes at 0° C. in order to precipitate protein impurities. After centrifugation and adjustment of pH to 7.5 the clear solution obtained (500 g., activity 40 u./g.) was dialyzed against tap water overnight and freeze-dried to give 4 g. with an activity of 4,900 u./g.

(j) Homogenized bacterial paste (1 kg. activity 128 u./g.) was centrifuged at 13,200 G (Serwall, Type RC–2, Automatic Superspeed Refrigerated Centrifuge) for 30 minutes at 0° C. The supernatant liquid (500 g., activity 80 u./g.) was decanted, clarified by filtration and used as such for enzymatic splitting of penicillin to produce 6-aminopenicillanic acid.

EXAMPLE 3—PREPARATION OF ACYLASE WITH TANNIN

Acylase solution pH fractionated according to Example 2h (185 kg., activity 47.5 u./g.) was agitated and treated with ethylenediamine tetraacetic acid (50 g.) followed by a solution of tannin (166 g.) and sodium sulphite (55 g.) in water (5.5 l.). After stirring for 1 hr. Celite 505 (1.5 kg.) and sodium sulphite (700 g.) was added and the suspension filtered yielding 3,950 g. of wet solid tannin-acylase precipitate with an activity of 1,930 u./g.

EXAMPLE 4—RECOVERY OF ACYLASE FROM THE TANNIN PRECIPITATE (a) Wet tanning-acylase precipitate acording to Example 3 (30.4 g., activity 1,930 u./g.) was treated with cold acetone (30 ml., –10° to –30° C.) which was added slowly with stirring. After the precipitate had partly dissolved an additional portion of cold acetone (200 ml.) was added at once and the mixture filtered. The solid was washed with cold acetone and dried in air at room temperature overnight. Yield 15.4 g., activity 3,650 u./g.

(b) Wet tannin-acylase precipitate (3,750 g., activity 1,930 u./g.) according to Example 3 was suspended into 0.1 molar ammonium acetate, pH 5.0 (5.0 l.) and butanol (2.5 l.). Sodium sulphite (50 g.) was added and pH adjusted to 5.0 by means of acetic acid. The stirring was continued for 20 minutes and the mixture filtered. The water phase (6,650 ml., activity 800 u./ml.) was separated.

(c) Acylase solution (1,000 ml., activity 49 u./ml.), pH-fractionated as in Example 2h, was treated with tannin according to Example 3. The tannin-acylase precipitate was filtered and suspended with stirring into 0.1 M ammonium acetate buffer, pH 8.0 (100 ml.). The stirring was continued for 1 hr. and pH controlled and adjusted to 8.0. The mixture was filtered giving 100 ml. of an acylase solution containing 220 u./ml.

(d) Wet tannin-acylase precipitate suspended in buffer solution, pH 8, (100 ml.) as in Example 4c was treated with DEAE-cellulose (2 g., capacity 1.0 m.-eq./g.). The mixture was stirred for 15 minutes and filtered giving an acylase solution (90 ml.) containing 494 u./ml.

(e) Wet tannin acylase precipitate (36.6 g.) activity 1,250 u./g.) obtained as in Example 3 was suspended into 0.2 M ammonium acetate buffer, pH 8 (150 ml.) and adjusted to pH 8.0. After stirring for 10 minutes butanol (60 ml.) was added followed by 9–M acetic acid to pH 5.0. The stirring was continued for 10 minutes and the mixture filtered. The water layer (166 ml., activity 140 u./ml.) was separated.

EXAMPLE 5—LYOPHILIZATION OF TANNIN-ACYLASE PRECIPITATE

Wet tannin-acylase precipitate (86.1 g., activity 1,600 u./g.) obtained as in Example 3 was cooled to −30° C. and dried in vacuo at 25° C. and 0.1–0.2 torr. The yield was 28.5 g. of a dry product with an activity of 2,340 u./g.

EXAMPLE 6—ISOLATION OF THE ENZYME BY DRYING (a) Spray-drying.—Clear acylase solution obtained as in Example 2h (5 l., activity 47.5 u./ml.) was spray dried at an air temperature of 110–115° C. at the inlet and 70–75° C. at the outlet during a period of 1 hr. Yield 85 g. activity 380 u./g.

(b) Float-drying.—Cellulose powder (100 g.) was mixed with acylase solution according to Example 4b (200 g., activity 162 u./g.). The resulting mixture was float dried in a stream of air at 40° C. for 90 min. 93.2 g. of a dry powder was recovered with an activity of 284 u./g.

EXAMPLE 7—PURIFICATION OF THE ACYLASE ACTIVITY BY ION EXCHANGE CHROMATOGRAPHY (a) Acylase solution (5,000 ml., activity 48 u./ml.) obtained as in Example 2c was adjusted to pH 4.6 by means of 9-M acetic acid. After standing overnight in cold the mixture was filtered and the clear solution submitted to an ion exchange column (Sulphoethyl Sephaldex® C 50, diameter 8 cm., length cm. in 0.1 M ammonium acetate, pH 4.6). The column was washed with the ammonium acetate buffer, pH 4.6 (650 ml.). The acylase was eluted with 0.2 M ammonium acetate buffer pH 8.0. The activity was obtained in 640 ml. with an activity of 326 u./ml.

(b) A purified solution of acylase (5,550 ml., activity 800 u./ml.) obtained according to Example 4b was adjusted to pH 4.6 and treated in the same way as in Example 7a. 2,350 ml. was obtained with an activity of 1,610 u./ml.

(c) Acylase solution, purified on SE-Sephadex as described in Example 7b (250 ml.) actiivty 1,610 u./ml.) was cooled to −40° C. and dried in vacuo at 0.1–0.2 torr by a temperature of 25° C. The yield was 2.11 g. of purified acylase with an activity of 190,000 u./g.

(d) Acylase solution, purified as in Example 7b (230 ml., activity 1610 u./ml.) was concentrated by evaporation in vacuo to a volume of 24 ml. 15 ml. of the concentrate, activity 15,000 u./ml., was submitted to a Sephadex G 75 column (diameter 2.5 cm., length 100 cm.). The acylase was eluted with deionized water. The acylase was obtained in 108 ml., activity 1,710 u./ml. Freeze-drying of this solution gave 1.8 g. with an activity of 92,500 u./g.

(e) Acylase preparation (72 mg.) obtained from a Sulphoethyl Sephadex G:50 column according to Example 7a and freeze-dried was dissolved in 0.005 M Na-phosphate buffer pH 6.30 (2.7 ml.) and dialyzed against the same buffer and then applied to a column containing carboxymethyl cellulose (Whatman CM–32, small ion capacity 1 meq. per g.; column length 13.5 cm., diameter 0.9 cm.) previously equilibrated with the buffer. The column was eluted with the following buffers: 0.005 M Na-phosphate buffer pH 6.30 (about 17 ml.), 0.02 M Na-phosphate buffer pH 6.35 (about 17 ml.), and 0.1 Na-phosphate buffer pH 6.35.

Fractions of 1.3 ml. were collected and the extinction at 280 m$\mu$ measured. The total enzyme activity was eluted with the 0.1 M buffer and contained only 10% of the original protein content. About 90% of the total extinction were found as inactive protein in fractions containing 0.005 M buffer.

(f) A solution obtained according to Example 2b (100 ml.) was dialyzed against distilled water and then against 0.005 M phosphate buffer pH 6.0 for 24.5 hours. Diethylaminoethyl cellulose (Whatman DE–32, small ion capacity 1.0 meq. per g.) (12.5 mg./ml.) equilibrated with the above mentioned buffer was added. The ion exchange cellulose was separated after 30 minutes. No decrease of acylase activity was observed but the extinction at 280 m$\mu$ was only 10% of the previous value. The enzyme activity was then adsorbed by carboxymethyl cellulose (Whatman CM–32) treated with HCl and washed or equilibrated with 0.005 M sodium acetate pH 5.5. In both cases two different amounts of ion exchanger were used namely 12.5 mg. and 3.2 mg. per ml. respectively. After separation of the ion exchanger the enzyme activity was eluted after dispersing the ion exchanger in water by increasing the pH to 6–7 and the ionic strength by addition of 0.1 M phosphate buffer. The yield was about 80%.

(g) A solution obtained according to Example 2h (100 ml.) was dialyzed against distilled water and then against 0.005 M phosphate buffer pH 6.0 for 22 hours. The solution was treated two times with diethylaminoethyl cellulose (Whatman DE–32) (12.4 mg. per ml.) equilibrated with the above mentioned buffer. The solution was then treated with the same ion exchanger (13 mg. per ml.) in OH-form without loss of acylase activity. The ion exchanger was separated 30 minutes after the addition of the same. After the last addition the pH had increased to 8.31. The enzyme was then absorbed completely after addition of the ion exchanger in OH-form (50 mg. per ml.). The pH was 9.11. After separation of the ion exchanger and dispersion of it in water the enzyme was eluted by adjusting the pH to about 6. The yield was above 60% and the purity of the enzyme measured as the ratio of activity to extinction at 280 m$\mu$ was increased twentyfold.

(h) A solution obtained according to Example 2c (100 ml.) was partially desalted by dialysis against distilled water for one hour and then treated with carboxymethyl cellulose in the H+-form (Whatman CH–32 small ion capacity 1 meq. per g.) (about 40 mg. per ml.). The pH was controlled to be 4.0–4.5. The ion exchanger was separated and the absorbed acylase eluted by increasing the pH to about 6 and the ionic strength by addition of phosphate buffer.

(i) The procedure according to Example 7h was repeated but as starting material a solution obtained according to Example 2h was used.

(j) A solution (100 ml.) obtained according to Example 2c was partially desalted and deproteinized by treatment with about 25 mg. per ml. of carboxymethyl cellulose (Whatman CM–32) in the H+-form and then with the same amount of diethyl aminoethyl cellulose (Whatman DE–32) in the OH−-form. The pH was controlled to fall within the interval 5–7. (The treatment may be repeated but should be stopped before substantial amounts of acylase are absorbed.) The enzymes was then adsorbed by carboxymethylcellulose and eluted as in Example 7h.

(k) A solution obtained according to Example 2c (100 ml.) or 2h was treated as in Example 7j except that no diethylaminoethyl cellulose was used.

EXAMPLE 8—CONCENTRATION-PURIFICATION OF THE ACYLASE ACTIVITY BY ULTRAFILTRATION

A solution obtained according to Example 2c (10 ml.) and partially desalted and deproteinized by treatment with ion exchanger as described in Example 7j, but omitting the last step comprising adsorbance by carboxymethyl-cellulose, was diluted with distilled water (40 ml.) and pressure filtrated through a membrane completely retaining molecules having a molecular weight of more than 50,000 (Diaflo® membrane from Amicon Corporation, Cambridge, Mass., U.S.A.). The concentrate (2 ml.) containing the main part of the acylase was freeze-dried.

EXAMPLE 9—PRECIPITATION OF THE ACYLASE ACTIVITY BY MEANS OF AMMONIUM SULPHATE (a) To a purified solution of acylase obtained as in Example 4b (1,000 ml., activity 358 u./ml.) was added ammonium sulphate (570 g.). The mixture was stirred until the salt had dissolved. After standing at 5° C. for 2 hrs. the precipitate formed was filtered. The yield was 52.5 g. of wet compound with an activity of 5,160 u./g.

(b) The wet compound obtained as in Example 9a (47.0 g., activity 5,160 u./g.) was dried in air at 25° C. overnight. Yield 19.85 g., activity 7,580 u./g.

EXAMPLE 10—PURIFICATION OF THE ACYLASE ACTIVITY BY DIALYSIS

Acylase solution (11 ml., activity 48 u./ml.) obtained according to Example 2c was dialyzed against deionized water overnight. The dialyzed solution was lyophilized as in Example 5. Yield 0.06 g. with an activity of 8,000 u./g.

EXAMPLE 11—PURIFICATION OF THE ACYLASE ACTIVITY BY GEL FILTRATION

Acylase solution, obtained according to Example 4b (150 g., activity 166 u./g.) was concentrated by evaporation in vacuo to a volume of 9 ml., submitted to gel filtration on a Sephadex® G 75 column 3 x 80 cm., and eluted with deionized water. The activity, (21,200 u.) was recovered in 80 ml. containing 15.2% of the applied material, measured on an adsorption at 280 mµ basis.

EXAMPLE 12—COUPLING OF E. COLI ACYLASE TO POLYMERS (a) An agarose solution (Sepharose 4B®, 4%, 2.5 ml.) was filtered and the isolated wet solid was stirred for 8 min. at pH 11.5–12.0 in icecold aqueous cyanogen bromide (5%, 2 ml.). The solid gel was recovered by filtration and washed well on the filter with ice-water and ice-cold 0.1 M borax. It was then suspended in 0.1 M borax (4 ml.) and stirred with E. coli acylase (activity 159,000 u./g.; 0.106 g.), obtained according to Example 7d, for 24 hrs. at +4° C. The mixture was filtered and the recovered solid material was washed thoroughly on the filter with water to give 1.2 g. of wet polymer with an specific activity of 679 u./g.

(b) Sephadex® G 25 (0.100 g.) was stirred for 8 min. at pH 11.5–12 with ice-cold aqueous cyanogen bromide (5%, 2 ml.) and filtered.

The recovered gel was washed well with ice-water and ice-cold 0.1 M borax (4 ml.). E. coli acylase (activity 159,000 u./g.; 0.106 g.) obtained according to Example 7d, was added and the mixture was stirred for 24 hrs. at +4° C. Then the mixture was adjusted to pH 7.5 and filtered. The solid material was washed well on the filter with water to give 0.3 g. of polymer with an specific activity of 212 u./g.

(c) Experiment b was repeated with DEAE-Sephadex® A 50 (0.1 g.) instead of Sephadex® G 25. The yield was 1.25 g. of wet polymer with a specific activity of 435 u./g.

(d) Experiment b was repeated with the Sephadex® G 25 replaced with cellulose powder (Macherey, Nagel & Co., MN–300; 0.1 g.). The yield was 0.35 g. of polymer with an specific activity of 261 u./g.

EXAMPLE 13—PRODUCTION OF 6-AMINOPENICILLANIC ACID

To an enzyme solution (283 g., activity 42 u./g.) was added a solution of benzylpenicillin (20 g.) as potassium salt in water (317 ml.).

The mixture was incubated at 37° C. and the pH kept at 7.8 by the periodic addition of 2.5 N sodium hydroxide. After 6 hours the reaction mixture contained 10.7 g. of 6-aminopenicillanic acid (92%) and was filtered. The pH of the solution was adjusted to 3 with 5 N hydrochloric acid and extracted with a half volume of methylisobutylketone to remove the residual benzylpenicillin and the phenylacetic acid side chain, which is split off during the formation of the 6-aminopenicillanic acid. After the extraction the water solution was separated from the methylisobutylketone.

The pH of the water solution was adjusted to 7.5 and the volume reduced to 120 ml. in vacuo. The concentrated solution was cooled to 5° C. and filtered. When the filtered solution was acidified to pH 4.3 with 5 N hydrochloric acid the crystalline 6-aminopenicillanic acid precipitated.

After filtration the crystals were washed with a little cold water followed by dry acetone and dried in vacuo to give a yield of 8.84 g. of 6-aminopenicillanic acid. The purity of the product was 95% and the total yield calculated on the benzylpenicillin was 72%.

EXAMPLE 14—PREPARATION OF 6-AMINOPENICILLANIC ACID (a) To an enzyme solution (375 g., activity 33.8 u./g.) obtained as in Example 2c was added benzylpenicillin as potassium salt (21 g.) dissolved in water (325 ml.).

The solution was incubated at 37° C. and the pH kept at 7.8 by the periodic addition of 2.5 N sodium hydroxide. After 6 hours the solution was cooled to 10° C. and extracted at pH 2 with methylisobutylketone (200 ml.) to remove the residual benzylpenicillin and the phenylacetic acid side chain, which is split off during the formation of the 6-aminopenicillanic acid. After the extraction the water solution was separated from the methylisobutyl ketone.

The pH of the water solution was adjusted to 7.5 and the volume reduced to 110 ml. in vacuo. The concentrated solution was cooled to 5° C. and filtered. When the filtered solution was acidified to pH 4.3 with 5 N hydrochloric acid the crystalline 6-aminopenicillanic acid precipitated.

After filtration the crystals were washed twice with cold water (5 ml.) followed by dry acetone (twice with 5 ml.) and dried in vacuo to give a yield of 8.51 g. of 6-aminopencillanic acid. The purity of the product was 99% and the total yield calculated on the benzylpenicillin was 69%.

In analogous way 6-aminopenicillanic acid was prepared using enzyme preparations prepared according to the preceding examples. Yield and purity of the acid obtained is given in the following Table I.

TABLE I

| Ex. | Benzylpenicillin potassium salt, g. | Enzyme | | | 6-aminopenicillanic acid | | |
|---|---|---|---|---|---|---|---|
| | | Prepared as in Example— | Amount, g. | Activity, u./g. | Yield, g. | Purity, percent | Yield,* percent |
| 14b | 21 | 3 | 6.3 | 1,600 | 10.1 | 98.2 | 82 |
| 14c | 21 | 4a | 4.2 | 2,920 | 9.8 | 96.0 | 78 |
| 14d | 500 | 4b | 450 | 800 | 261.3 | 98.5 | 89 |
| 14e | 21 | 5 | 5.4 | 2,340 | 7.55 | 97.0 | 60 |
| 14f | 21 | 7a | 145 | 87 | 9.9 | 100 | 81 |
| 14g | 2,100 | 7b | 780 | 1,610 | 1,064 | 100 | 88 |
| 14h | 21 | 7c | 0.1 | 128,000 | 9.3 | 98.0 | 75 |
| 14i | 21 | 7d | 0.11 | 116,500 | 10.35 | 100 | 85 |
| 14j | 21 | 9b | 5.4 | 2,400 | 9.1 | 100 | 75 |
| 14k | 21 | 10 | 2.4 | 6,000 | 8.82 | 100 | 72 |
| 14l | 21 | 9a | 0.9 | 14,000 | 9.23 | 100 | 76 |

*Corrected for purity.

EXAMPLE 15—PREPARATION OF p-NITROBENZYLESTER OF 6-AMINOPENICILLANIC ACID

An enzyme solution (18.6 g., activity 1610 u./g.) obtained as in Example 7b was diluted with water (700 ml.) and methanol (120 ml.) and adjusted to pH 7.8 by the addition of 0.1 molar sodium hydroxide. A solution of p-nitrobenzyl benzylpenicillinate (3.1 g., 6.6 mol) in methanol (60 ml.) was added. The mixture was stirred at 37° C. and kept at pH 7.8 by the addition of 0.1 molar sodium hydroxide. After 2.5 hours the mixture was cooled and extracted with ethyl acetate (500 ml.). The aqueous layer was separated and extracted with an additional portion of ethyl acetate (250 ml.). The organic layers were combined and dried with anhydrous sodium sulphate for 1 hr. After filtration the organic solution was divided into two equal parts. One was concentrated in vacuo at room temperature to give the free p-nitrobenzylester of 6-aminopenicillanic acid as an oily residue (1.1 g.). The product was found to contain in its IR-spectrum bands at 3250, 1756, 1720 cm.$^{-1}$, showing the presence of a NH$_2$-group, β-lactam ring and ester group respectively.

Benzenesulphonic acid (0.58 g.) dissolved in acetone (20 ml.) was added to the other part of ethyl acetate solution which then was concentrated in vacuo to a volume of about 30 ml. On addition of ether (10 ml.) and standing over night in the ice box the benzenesulphonic acid salt of p-nitrobenzyl 6-aminopenicillinate (0.8 g.) deposited as white crystals, M.P. 148–151° C., identical with the product described in British patent application No. 33,734/67, Example 4.

EXAMPLE 16—PREPARATION OF 6-(D-α-AZIDO-FENYLACETAMIDO)-PENICILLANIC ACID

To an enzyme solution (283 g., activity 42 u./g.) was added a solution of benzylpenicillin (20 g.) as potassium salt in water (317 ml.)

The mixture was incubated at 37° C. and the pH kept at 7.8 by periodic addition of 2.5 N sodium hydroxide. After 6 hours the reaction mixture contained 10.7 g. of 6-aminopenicillanic acid (92%) and was filtered.

The solution was cooled to 5° C. and acidified to pH 3.0 with 10 N sulphuric acid. Methylisobutylketone (300 ml.) containing D-α-azidophenylacetyl chlorine (62 mm.) was added during stirring. The stirring was continued 30 minutes and pH was kept at 3.0 by periodic addition of 2.5 N sodium hydroxide. The reaction mixture was filtered through Celite 505 (10 g.) and the methylisobutyl ketone was separated from the water phase.

The methylisobutyl ketone solution was dried with water-free sodium sulphate (25g.).

After filtration the 6-(D-α-azido-fenylacetamido)-penicillanic acid was precipitated as sodium salt by addition of 41 ml. of a 2 N solution of the sodium salt of 2-ethyl-caproic acid in methylisobutyl ketone.

The sodium salt of 6-(D-α-azido-fenylacetamido)-penicillanic acid was filtered. The crystals were washed with 50 ml. methylisobutyl ketone (50 ml.) and dried in vacuo at 50° C. to give a yield of 16.5 g. The purity of the product was 96% and the total yield calculated on the benzylpenicillin was 75%.

In analogous way 6-(D-α-azido-fenylacetamido)-penicillanic acid sodium salt was prepared using other enzyme preparations prepared according to the preceding examples. Yield and purity of the penicillin is given in the following Table II.

TABLE II

| Ex. | Benzyl-penicillin potassium salt, g. | Enzyme Prepared as in Example— | Enzyme Amount, g. | Enzyme Activity, u.g. | 6-(D-α-azido-fenylacetamido)-penicillanic acid Yield, g. | 6-(D-α-azido-fenylacetamido)-penicillanic acid Purity, percent | 6-(D-α-azido-fenylacetamido)-penicillanic acid Yield,* percent |
|---|---|---|---|---|---|---|---|
| 16b | 21 | 3 | 6.3 | 1,600 | 18.9 | 95.8 | 82 |
| 16c | 21 | 4a | 4.2 | 2,920 | 18.0 | 94.0 | 71 |
| 16d | 21 | 5 | 5.4 | 2,340 | 16.2 | 89.7 | 66 |
| 16e | 21 | 7a | 145 | 87 | 20.4 | 95.8 | 85 |
| 16f | 21 | 7b | 6 | 1,890 | 19.7 | 96.6 | 87 |
| 16g | 21 | 7c | 0.1 | 128,000 | 18.5 | 96.0 | 76 |
| 16h | 21 | 9b | 5.4 | 2,400 | 20.5 | 92.7 | 89 |
| 16i | 21 | 10 | 2.4 | 6,000 | 18.5 | 95.5 | 75 |
| 16j | 21 | 9a | 0.9 | 14,000 | 20.0 | 91.4 | 89 |

*Corrected for purity.

EXAMPLE 17—ENZYMATIC SYNTHESIS OF BENZYLPENICILLIN

6-APA (175 mg.) and phenylacetic acid (111 mg.) was dissolved in potassium phosphate buffer (10 ml.) at pH 7.0. Acylase prepared as in Example 7c (3.6 mg., activity 128,000 u./g.) was dissolved in water (5 ml.) and added to the first prepared solution.

The pH was adjusted to 5.0 with 1 M H$_3$PO$_4$ and the solution was incubated at 37° C. The pH was kept at 5.0 and after 4 hours the solution was cooled and analyzed by paper chromatography. 30% of the 6-APA was transferred to benzylpenicillin.

EXAMPLE 18—FIXING OF PENICILLIN ACYLASE TO A POLYMER CARRIER

Sephadex G 200 (0.5 g.) was added to water (20 ml.) and left at room temperature for three days. Thereafter, the mixture was cooled and a cold solution of cyanogen bromide (1 g.) in ether (15 ml.) was added with stirring. The pH was kept at 11.5–12 by addition of sodium hydroxide. After the reaction had ceased the mixture was filtered and the wet polymer washed with ice-water and finally with ice-cold 0.1 M borax solution.

The wet polymer was added to a solution of penicillin acrylase (10 ml., activity 400 u./ml.) followed by solid borax (380 mg.) and the mixture was stirred at +4—5 C. for 24 hours. Thereafter the sephadex-acylase compound was filtered and washed with water giving 4.9 g. of wet substance with an activity of 3750 u./g.

EXAMPLE 19—FIXING OF PENICILLIN ACYLASE TO A POLYMER CARRIER

Sephadex G 200 (250 g.) was added to water (12.5 liters) and left at room temperature for three days. Thereafter the mixture was cooled and 5 N sodium hydroxide (6 liters) was added. With vigorous stirring cyanogen chloride (320 g.) was conveyed into the mixture at 0–3° C. during a period of 1.5 hours. Hyflo Super Gel (700 g.) was added and the mixture was filtered and washed with cold water (40 liters) followed by cold 0.1 M borax (20 liters).

The wet substance was added to a solution of penicillin acylase (3,000 ml. contain 6550 u./ml.) followed by borax (190 9.). The mixture was stirred for 24 hours at +4–5° C. whereupon the polymer was filtered and washed with water giving 5072 of wet sephadex-acylase with an activity of 1245 u./g. Penicillin acylase not coupled in the reaction could be almost quantitatively recovered from the mother liquor by desalting on Sephadex G 25 and concentrating of the solution in vacuo. This solution could be used directly in a new coupling reaction.

EXAMPLE 20—PREPARATION OF 6-AMINO-PENICILLANIC ACID

Sephadex-acylase, prepared according to Example 19, (17 g., activity 1245 u./g.), was suspended in water (600 ml.), boric acid (2.2 g.) added followed by benzylpenicillin potassium salt (21 g.) in water (100 ml.). The mixture was stirred at 35° C. and the pH kept constant at 7.0 by addition of 0.5° N sodium hydroxide. After 3 hours the reaction mixture, containing 11.7 g. of 6-aminopenicillanic acid (6–APA) (96%), was filtered and the solution extracted with a half volume of methyl isobutyl ketone at pH 3 by addition of 5 N hydrochloric acid in order to remove unreacted penicillin and phenylacetic acid split off during the reaction. The water solution was separated, adjusted to pH 7.5 by addition of sodium hydroxide and concentrated in vacuo to a volume of about 120 ml.

The solution was cooled to 5° C. and acidified with stirring to pH 4.3 by addition of 5 N hydrochloric acid in order to precipitate crystalline 6–APA. After 1 hour the crystals were filtered, washed with cold water followed by dry acetone and dried in vacuo to give 6-aminopenicillanic acid (10.6 g., purity 99%, total yield 86%).

EXAMPLE 21—PREPARATION OF 6-(D-α-AMINO-PHENYLACETAMIDO) PENICILLANIC ACID

Sephadex-acylase (260 g., activity 1500 u./g.) was suspended in water (9 liters), $NaH_2PO_4$, 2 aq. (91 g.) in water (1 liter) adjusted to pH 7.0 with sodium hydroxide, added, followed by benzyl penicillin potassium salt (350 g.). The mixture was incubated at 35° C. with stirring and the pH kept constant at 7.0 by addition of 0.5 N sodium hydroxide. After 165 minutes the mixture was filtered and the solution containing 195 g. of 6-aminopenicillanic acid was cooled to 9° C. and acidified to pH 3.0 with 5 M sulphuric acid. Methyl isobutyl ketone (5.3 liters) was added followed by a solution of D-α-azido-phenylacetyl chloride (0.96 mol) in methyl isobutyl ketone (400 ml.) during a period of 25 minutes. The pH was kept at 3.0 by periodic arrition of 2.5 N sodium hydroxide (1100 ml.) and the stirring continued for an additional 20 min. period. The organic layer was separated, filtered with Celite 505 (100 g.), cooled and extracted at pH 7.0 by addition of 15% potassium hydroxide (225 ml.). The water phase was separated and the organic layer extracted with an additional amount of 15% KOH (15 ml.). The water solutions of 6-(D-α-azido-phenylacetamido)penicillanic acid were pooled and adjusted to 1.35 liters by addition of water.

Raney nickel (30 g.) was suspended in water and hydrated at 60 p.s.i. and 20° C. for 30 minutes. Thereafter the penicillin solution was added during cooling in ice-water and hydrated at 60 p.s.i. and 20° C. for 30 minutes. The catalyst was filtered and the solution rapidly cooled and adjusted from pH 9.8 to 2.0 by addition of 5 M sulphuric acid. The solution was extracted with methyl isobutyl ketone (1650 ml.) in the cold, the water phase separated and adjusted to pH 4.5 with 15% KOH (280 ml.). After stirring in ice-water bath for 2 hours the crystalline substance was filtered, washed with cold water and dried in vacuo overnight to give 201 g. of 6-(D-α-aminophenylacetamido)penicillanic acid. Purity 98.2% (as trihydrate), yield 52%.

EXAMPLE 22—PREPARATION OF SODIUM 3-o-CHLOROPHENYL - 5 - METHYL-4-ISOXAZOLYL PENICILLIN 6-aminopenicillanic acid (84 g.) prepared as in Example 3 was suspended in water (1200 ml.), the mixture cooled to 5° C. and pH adjusted to 7.5 by addition of 10% sodium hydroxide (123 ml.) with stirring. Methyl isobutyl ketone (1200 ml.) was added followed by 3-o-chlorophenyl-5-methylisoxazole-4-carbonyl chloride (120 g.) in methyl isobutyl ketone (100 ml.). The stirring was continued for 2 hours at 22–27° C. The organic layer was separated and dried with 60 g. of anhydrous sodium sulphate. Anhydrous sodium acetate (37.2 g.) was added to the clear organic solution and the mixture stirred for two hours at room temperature. The crude penicillin salt was filtered, washed with methyl isobutyl ketone and dried in vacuo overnight. The yield was 171.6 g. The crude sodium salt was recrystalized from water (170 ml.) and isopropyl alcohol (170 ml.) by addition of anhydrous isopropyl alcohol (2170 ml.). The mixture was stirred for 4 hours, the crystalline substance filtered and washed with isopropyl alcohol and dried in vacuo overnight, to give 145.1 g. of sodium 3-o-chlorophenyl-5-methyl-4-isoxazolyl penicillin, purity 97.9%, total yield 76.5%.

EXAMPLE 23—ANTIGENICITY TESTS

Method: Passive cutaneous anaphylaxis in guinea pigs essentially according to de Weck et al. Int. Arch. Allergy 33 (1968) 535–567.

Rabbit 6–APA antiserum was produced by repeated subcutaneous injections of crude 6–APA plus two injections by the same route of a retentate from a dialyzed 6–APA batch. In passive hemagglutination tests this antiserum showed a titre of 1/4096. One ml. of this 6–APA antiserum was injected intravenously in a white guinea pig. Twenty-four hours later 0.1 ml. of a 5% solution in saline of Evans blue was administered intravenously followed 1 hour later by intradermal administration of 0.1 ml. containing 4 mg. of 6–APA prepared according to Examples 14d, 14g, and 14i, respectively. On a fourth site on the back of the animal a sample of 6–APA prepared in a conventional way using whole cells of *E. coli* was likewise given. The 6–APA samples were injected immediately upon their dissolution. As control 0.1 ml. of normal saline was injected intradermally. In a second guinea pig the same procedure was repeated except that the 6–APA antiserum was replaced by 1 ml. of normal saline given intravenously.

Two hours after the intradermal injections the extent of blueing at the injection sites was determained and expressed as the product of two perpendicular diameters.

Results

In both animals the nonsensitized and the one passively sensitized all 6–APA samples caused spreading of the dye, which was more pronounced than at the site of saline injection. However, as Table III shows the conventional 6–APA sample caused a stronger reaction in the sensitized animal. The same, although to a much lesser extent, is done for the 6–APA obtained according to the invention.

TABLE III

The product of two perpendicular diameters (mm.$^2$) of blue spots caused by injection of 4 mg. intradermally of compounds indicated

| | Sensitized animal | Non-sensitized animal | Difference |
|---|---|---|---|
| Prepared by use of *E. coli* cells | 256 | 110 | 146 |
| 6–APA according to Example No— | | | |
| 14d | 132 | 120 | 12 |
| 14g | 195 | 169 | 26 |
| 14i | 156 | 169 | −13 |
| Saline | 12 | 12 | |

The results show that a sample of 6–APA prepared by conventional methods differs from the other sample of 6–APA with regard to ability to elicit the passive cutaneous anaphylactic reaction. This is an expression of reduced antigenicity in 6–APA according to the present invention as compared to 6–APA prepared by conventional procedures, using whole cells from *E. coli*.

EXAMPLE 24—DETERMINATION OF PROPERTIES WITH 6-AMINOPENICILLANIC ACID AND PENICILLINS PREPARED USING POLYMER-FIXED PENICILLIN ACYLASE

The following parameters were determined on 6-aminopenicillanic acid prepared from polymer-fixed penicillin acylase and on 6 - (D-α-aminophenylacetamido)-penicillanic acid and 3-(o-chlorophenyl)-5-methyl-4-isoxazolylpenicillin prepared using such 6-aminopenicillanic acid:

(A) Penicillin immunogenicity (antibody value)
(B) Contents of high-molecular impurities
(C) Contents of amino acids (proteins).

The following methods were used.

(A) Determination of penicillin immunogenicity (antibody value)

Principle.—Dialyzis retentate is given to three albino rabbits as three weekly injections by the subcutaneous route. Blood samples are collected one week after each injection and two weeks after the last one. The amount of antibodies in the blood samples is determined, and is expressed as antibody number which is the sum of all the individual titre values. The higher the antibody number the more immunogenic is the penicillin preparation.

Preparation of dialyzis retentate of the tested penicillins and 6-aminopenicillanic acid is carried out as follows:

A solution of sodium 3 - o-chlorophenyl-5-methyl-4-isoxazolyl penicillin (10 g.) in deionized water (200 ml.) is transferred to a semipermeable tube and dialyzed against flowing water during five days. Thereafter, the retentate is concentrated in vacuo to a volume of 10 ml. Solutions of 6-aminopenicillanic and 6-(D-α-aminophenylacetamido) penicillanic acid are dialyzed and concentrated in the same manner. For dissolving these substances, however, sodium hydroxide must be added.

Immunization.—Dialyzis retentate of the penicillin sample is emulsified with Freund's complete adjuvant. The mixture is injected subcutaneously in the rabbit in an amount corresponding to 250 mg. of penicillin. Injections are made at day 0.8 and 15. Three rabbits are treated identically.

Blood is collected at day 8, 15, 22 and 29. Serum is prepared and tested for the presence of antibodies.

Antibody determination.—The amount of anti-penicillin antibodies present in the serum sample is determined by a passive hemagglutination technique described by Thiel et al., J. Allergy 35 399 (1964). The highest serum dilution giving agglutination of penicilloylated red blood cells is determined and is taken as the antibody titre of that particular serum sample. The titre values of twelve such serum samples—obtained from the three rabbits participating in the test—are added to make up the antibody value. The antibody value is thus an expression of the potency of the penicillin preparation as an immunogen.

(B) Separation and determination of high molecular impurities in penicillins by gel permeation chromatography (GPC)

An aqueous solution of the penicillin is run on a GPC-column (Sephadex G 25). Proteins and other high molecular impurities are eluted with the "void volume" while the penicillin is retarded. The UV-absorption is continuously registered.

Apparatus.—Chromatography column 5 x 100 cm.; Uvicord I with recorder, LKB Products; peristaltic pump; pH-meter. I Reagents.—Sephadex G 25 Fine, Pharmacia Fine Chemicals; 5 N sodium hydroxide.

Column.—330 g. Sephadex G 25 Fine is allowed to swell in excess of purified water for 24 hours. The column is packed according to the manufacturers instruction.

Procedure.—10 g. of penicillin is dissolved or suspended in 35 ml. of purified water. In case of not soluble in this volume 5 N sodium hydroxide is added drop-wise under pH control and vigorous stirring until the penicillin is dissolved. pH is kept below 9.0 under this procedure.

The penicillin solution is transferred to the column and chromatographed with water as eluant at a flow rate of 1–2 ml. per minute. The column shall be run with ascending flow.

The UV-absorption of the eluate at 254 nm. is recorded (Uvicord). The absorbance of the high molecular fraction in the 'void volume" is measured.

Determination of contents of amino acids in penicillin preparations

Dialyzis retentate of 10 g. penicillin is evaporated to dryness at a temperature of not more than 40° C. The retentate is transferred to a test tube containing 10 ml. 6 N HCl. The sample solution obtained is freezed and the test tube thereafter evacuated and sealed by heating. The sample is hydrolyzed at 110° C. for 22 hours whereafter it is evaporated to dryness and thereafter redissolved in 0.2 N sodium-citrate buffer of pH 2.2. The content of amino acids in the sample is thereafter analyzed by Stein-Moore technique using a Beckman type 120C amino acid analyzer. For analysis of basic amino acids resin Aminex A–5 and 0.35 N sodium-citrate buffer, pH 5.25, is used. For analysis of acidic and neutral amino acids resin Aminex A–4 and 0.2 N sodium-citrate buffer, pH 3.25 respectively 0.2 N sodium-citrate buffer, pH 4.25, is used. The analysis is carried out at a temperature of 50° C. The content of protein in the tested penicillin preparation is calculated by adding the amounts of amino acids determined and is given in terms of weight, parts per million, p.p.m.

The results of the tests described under A, B, and C above on 6-aminopenicillanic acid, 6-(D-α-aminophenylacetamido)penicillanic acid, and 3-(o-chlorophenyl)-5-methyl-4-isoxazolylpenicillin are collected in Table IV below. Test results on 6-aminopenicillanic acid prepared from penicillin G using polymer-fixed penicillin acylase from *E. coli* according to the invention are compared with test results on 6-aminopenicillanic acid prepared from penicillin G using cell suspensions of *E. coli* cells according to previous technique. In the same way, test results on 6-(D-α-aminophenylacetamido)penicillanic acid and 3 - (o-chlorophenyl)-5-methyl-4-isoxazolylpenicillin, prepared using 6–APA obtained according to the present invention, and using 6–APA obtained with *E coli* cell suspensions, are compared.

TABLE IV

Immunogenicity (antibody value) contents of high-molecular weight impurities, and contents of amino acids (proteins), in preparations of 6–APA, 6-(D-α-aminophenylacetamido)penicillanic acid and 3-(o-chlorophenyl)-5-methyl-4-isoxazolylpenicillin

| Substance | Contents of amino acids (p.p.m.) | High molecular impurities (absorbance at 254 nm.) | Antibody value |
|---|---|---|---|
| 6–APA prepared using acylase from unwashed *E. coli* cell suspensions. | 91 | 0.095 | 33 |
|  | 1,485 | 0.215 | 113 |
|  | 1,184 | 0.480 | 67 |
|  | 183 | 0.185 | 101 |
| 6–APA prepared using polymer-fixed acylase. | 30 | 0.015 | 0 |
|  | 23 | 0.010 | 1 |
|  | 44 | 0.020 | 0 |
|  | 35 | 0.080 | 1 |
|  | 19 | 0.020 | 4 |
|  | 12 | 0.060 | 3 |

| Substance | Contents of amino acids (p.p.m.) | High molecular impurities (absorbance at 254 mm.) | antibody value |
|---|---|---|---|
| 6-(D-α-aminophenylacetamido) penicillanic acid prepared using unisolated 6-APA prepared via E. coli cell suspensions. | 54<br>178<br>178<br>148<br>70 | 0.030<br>0.025<br>0.025<br>0.030<br>0.035 | 17<br>26<br>26<br>31<br>26 |
| 6-(D-α-aminophenylacetamido) penicillanic acid from unisolated 6-APA prepared using polymer-fixed acylase. | 17 | 0.015 | 5 |
| 3-(o-chlorophenyl)-5-methyl-4-isoxazolylpenicillin from isolated 6-APA prepared via E. coli cell suspensions. | 11<br>11 | 0.155<br>0.120 | 4<br>8 |
| 3-(o-chlorophenyl)-5-methyl-4-isoxazolylpenicillin from 6-APA prepared using polymer-fixed acylase. | 2 | 0.035 | 2 |

One reason for the occurrence of such allergic reactions which may occur at therapeutical use of penicillins is the presence of proteinaceous impurities in the preparations administered to the patients. As is evident from the test results reported in Table IV, the amount of proteins and other high molecular weight impurities in penicillin— and 6–APA-preparations is significantly reduced when polymer-fixed penicillin acylase according to the present invention is used. It is also evident from Table IV that the antibody value of the tested preparations is sharply reduced in the preparations prepared using polymer-fixed penicillin acylase in comparison with the preparations prepared using previously known preparations of penicillin acylase, which means that use of the polymer-fixed penicillin acylase results in preparations of penicillins and 6–APA with less tendency to produce allergic reactions at administration to patients. Thus it is established by three independent methods that use of polymer-fixed penicillin acylase in the preparation of 6-aminopenicillanic acid results in markedly improved properties with regard to hypoallergenicity in the 6-aminopenicillanic acid obtained and in semisynthetic penicillins prepared from such 6-aminopenicillanic acid.

We claim:

1. A continuous process for the production of hypoallergenic 6-aminopenicillanic acid by enzymatic degradation of an enzymically deacylable natural penicillin with an *Escherichia coli* penicillin acylase, which process comprises reacting the penicillin with a penicillin acylase preparation consisting of cell-free *Escherichia coli* penicillin acylase chemically fixed to a polymeric support, said penicillin acylase preparation being obtained by (a) fermenting an *Escherichia coli* strain producing intracellular penicillin acylase;

(b) simultaneously separating the cell material from the culture broth of the microorganism and releasing the intracellular penicillin acylase form the cell material in a self-cleaning centrifugal separator by applying to said cell material a centrifugal force corresponding to a pressure of about 500 p.s.i. to 2,000 p.s.i. at a temperature ranging from about 0° C. to 50° C. and intermittently expelling the cell material through a peripheral slit;

(c) stirring the expelled cell material in aqueous solution at a temperature ranging from about 10° C. to 50° C. for about 10 to 5.0 hours to dissolve the acylase relased in step (b);

(d) subsequently extracting the acylase from the inactive cell material of the aqueous solution; and (e) coupling chemically of the extracted acylase to an activated polymeric material.

2. A process according to claim 1, wherein the penicillin is benzyl penicillin.

3. A process according to claim 1, wherein the activated polymeric material used in step (e) is a polysaccharide treated with a cyanogen halide.

4. A process according to claim 3, wherein the activated polymeric material used in step (e) is a polysaccharide treated with cyanogen bromide.

5. A process according to claim 3, wherein the activated polymeric material used in step (e) is a polysaccharide treated with cyanogen chloride.

6. A process according to claim 3, inclusive wherein the polysaccharide is equilibrated with water and thereafter reacted in an aqueous medium with the cyanogen halide at a temperature of from about 0° C. to about 25° C. during a time period from about 2 to about 30 hours at a pH of 8.5–9.5.

7. A process according to claim 1 wherein an aqueous suspension of the activated polymeric material and the natural penicillin is incubated at a temperature of from about 30° C. to about 45° C. at a pH of 6.5–8.2 until the enzymatic reaction has ceased.

8. A process according to claim 1, wherein in step (b) a centrifugal pressure of 900–1100 p.s.i. is applied to the cell material at a temperature ranging from 15° C. to 40° C., and wherein the cell material is intermittently expelled within 0.05 to 1.0 sec. through a peripheral slit having a width of 0.1 to 1.5 mm.

9. A process according to claim 1 wherein the extracted enzyme is precipitated from the cell-free aqueous solution at pH 4 to 6 with tannin in the presence of chelating agents forming complexes with iron ions.

10. A process according to claim 1 wherein the culture broth is saturated with an organic solvent having low solubility in water selected from the group consisting of butylacetate, isobutylacetate, and amylacetate.

11. A process according to claim 1 wherein the expelled cell material is stirred in an aqueous solution containing 1.0–5.0% water immiscible organic solvent selected from the group consisting of methylisobutyl ketone, butylacetate, isobutylacetate, amylacetate, benzene, toluene and chloroform.

12. A process according to claim 11 wherein the pH of the aqueous solution is maintained between 6.5 and 9.0 by adding a base selected from the group consisting of sodium hydroxide, potassium hydroxide, ammonia, triethylamine and N-ethyl-piperidine.

13. A process according to claim 1 wherein any remaining inactive cell material is precipitated from the aqueous solution to pH 3.0–6.0 and thereafter adjusting the pH to 7.0–8.5.

14. A process according to claim 1 wherein the extracted acylase is concentrated and isolated by passing the aqueous acylase solution at pH 3.5–6.0 through a column of a cationic ion-exchanger and releasing the acylase by elution at pH 6.0–8.0 with a weak buffer solution containing an organic salt selected from the group consisting of ammonium acetate and trishydroxymethylammonium acetate.

15. A process according to claim 1 wherein the extracted acylase is isolated from said aqueous solution in the solid state by known drying techniques.

References Cited

UNITED STATES PATENTS 3,297,546 1/1967 Johnson et al. _____ 195—36 P
3,666,627 5/1972 Messing _____ 195—Dig. 11

ALVIN E. TANENHOLTZ, Primary Examiner

U.S. Cl. X.R.

195—66, Dig. 11; 424—271